P. Zimmerman.
Garbage Sink.
Nº 93,388. Patented Aug. 3, 1869.

Witnesses;
James P. Grews
D. D. Kane

Inventor;
Peter Zimmerman
Chipman Hosmer & Co
Attys

United States Patent Office.

PETER ZIMMERMAN, OF SYLVAN, PENNSYLVANIA.

Letters Patent No. 93,388, dated August 3, 1869.

IMPROVED ASH-HOPPER.

The Schedule referred to in these Letters Patent and making part of the same.

*To all whom it may concern:*

Be it known that I, PETER ZIMMERMAN, of Sylvan, in the county of Franklin, and State of Pennsylvania, have invented a new and valuable Improvement in Ash-Hoppers; and I do hereby declare that the following is a full, clear, and exact description of the construction and operation of the same, reference being had to the annexed drawings, making a part of this specification, and to the letters and figures of reference marked thereon.

Figure 1:
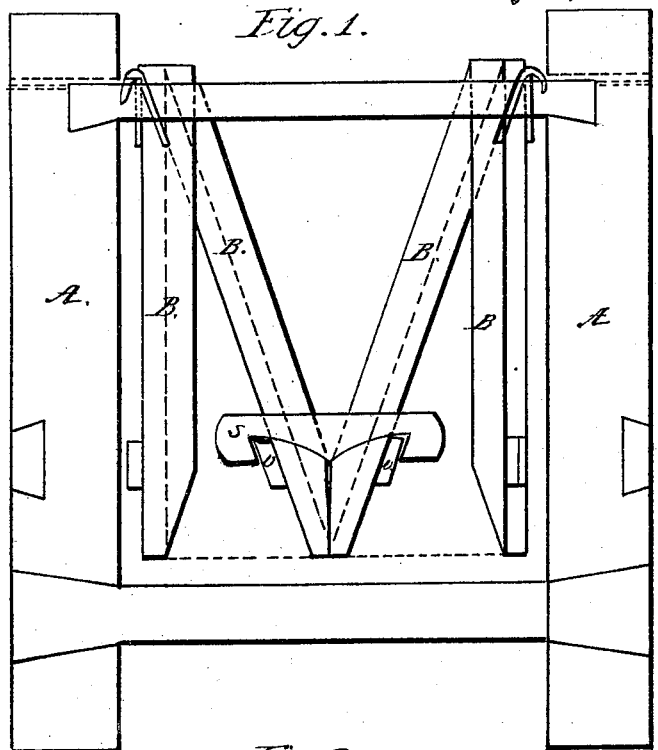

Figure 1, of the drawings, is a front plan view of my invention.

Figure 2:
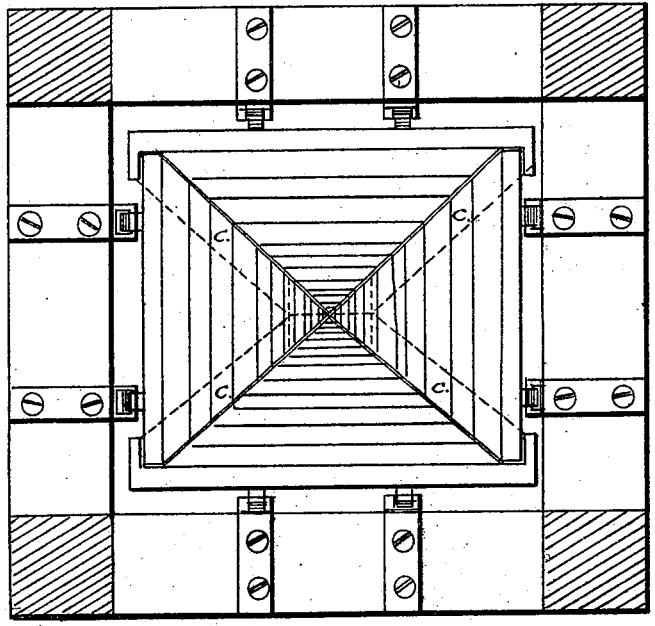

Figure 2 is a top plan view of the same.

My invention relates to receptacles for ashes; and

It consists, mainly, in a novel arrangement of devices, by which such receptacles may be readily unloaded, thereby saving the usual labor and difficulty of removing such ashes from their bin by means of a shovel only.

The letter A, of the drawings, represents a frame of four upright posts, with cross-bars at their tops and sides, as shown.

The letters B represent four triangular-shaped pendent or swinging sides to my ash-hopper, which are respectively hinged to the tops of the cross-bars, as shown, and which, when united at their bottoms, form a tight and convenient ash-bin or hopper for family use.

I attach flanches to two of these sides, by nailing strips or slats on their outer edges, as represented by the letters c.

The two sides upon which these flanches are not arranged, are constructed to fit closely inside these slats, and thereby to form a close, tight box, in the shape of a quadrangular funnel, but without any opening at its bottom.

For the purpose of locking the bottoms of these sides, and holding them securely, and also to provide means for emptying the hopper at will, I attach notched bars, of the form shown, to two of the swinging sides, and also make two other bars, adapted to fit and hook in the notches thereof, which are not attached to the hopper.

The letter $s$, of the drawings, represents one of these notched or toggle-bars that is not attached to the sides.

The attached bars are the same in form, but when attached have their hooks turned upward. These last-named bars are marked $v$ on the drawings.

This ash-hopper is intended as a bin, to become the daily receptacle of ashes from the house fire, and when filled, the operator empties the contents upon the ground by removing the bars $s$ from the locks or hooks of bars $v$.

I am aware that leaches have sometimes been constructed upon a principle analogous to my invention, but such leaches are always left open at the bottom, and are not intended as a receptacle for the ashes made from day to day by the family fire.

My ash-hopper forms a valuable substitute for the old barrels in common use by families, and if encouraged by the allowance of a patent, will tend to promote economy in the preservation of an invaluable product.

What I claim as my invention, and desire to secure by Letters Patent, is—

An ash-hopper, having frame A, sides B, and lock-bars $s$ and $v$, when all the parts are constructed and arranged substantially as and for the purposes specified.

In testimony that I claim the above, I have hereunto subscribed my name, in the presence of two witnesses.

PETER ZIMMERMAN.

Witnesses:
JACOB S. ZIMMERMAN,
J. C. McCULLOH.